United States Patent [19]

Campo et al.

[11] Patent Number: 5,723,517

[45] Date of Patent: Mar. 3, 1998

[54] SYSTEM FOR CONTROLLING THE COLOR OF COMPOUNDED POLYMER(S) USING IN-PROCESS COLOR MEASUREMENTS

[75] Inventors: Peter John Campo, Niskayuna; Paul Kenneth Houpt, Schenectady, both of N.Y.

[73] Assignee: General Electric Company, Schenectady, N.Y.

[21] Appl. No.: 858,665

[22] Filed: May 19, 1997

Related U.S. Application Data

[60] Continuation of Ser. No. 602,226, Feb. 15, 1996, abandoned, which is a division of Ser. No. 378,993, Jan. 26, 1995, Pat. No. 5,559,173, which is a continuation of Ser. No. 131,232, Oct. 4, 1993, abandoned.

[51] Int. Cl.[6] .................... G05D 25/02; G05D 25/00; B01F 15/04
[52] U.S. Cl. .................... 523/303; 425/135; 425/145; 425/169; 366/152.1; 364/468; 364/502; 137/93
[58] Field of Search .................... 523/303; 425/135, 425/145, 169; 366/152.1; 364/468, 502; 137/93

[56] References Cited

U.S. PATENT DOCUMENTS

| | | | |
|---|---|---|---|
| 4,403,866 | 9/1983 | Falcoff et al. | 366/142 |
| 4,684,488 | 8/1987 | Rudolph | 264/40.2 |
| 4,812,904 | 3/1989 | Maring et al. | 358/107 |
| 4,887,217 | 12/1989 | Sherman et al. | 364/468 |
| 5,355,309 | 10/1994 | Eberhard et al. | 364/413.15 |

FOREIGN PATENT DOCUMENTS 2020947  1/1991  Canada.

OTHER PUBLICATIONS

J. Grant et al., "On-Line Color Monitoring & Control (CMC)":—Concept Description—Section II—pp. 12–30, General Electric producted document, Jun., 1991.

J.E. Smith, "Color"—Image Processing for GE Pellets—Peport regarding General Electric funded work, Jan., 1991.

J.E. Smith et al., "Feasibility Study: Color Image Processing for Use in Colorimetric Qualtiy Control"—GE Plastics Research Project Final Report—pp. 1–31—Appendices A–E, 1992.

J.E. Smith et al., "Colormetric Quality Control with Computer Image Processing II", 1992.

J.E. Smith et al., "Feasibility Study: Color Image Processing Station for Use in Colorimetric Quality Control", 1990.

*Primary Examiner*—Andrew E. C. Merriam
*Attorney, Agent, or Firm*—Marvin Snyder

[57] ABSTRACT

A system for controlling the color of compounded polymer (s) comprises: a compounder for mixing the constituents of the compounded polymer(s) to produce a substantially homogeneous mixture; a sensor for measuring the color of the substantially homogeneous mixture at predetermined intervals; a colorant additive feeder, responsive to a controller, for providing the colorant additive(s) to the mixture at substantially predetermined colorant additive addition rates; and a controller, responsive to the sensor, for controlling the colorant additive addition rate(s) of the feeder.

10 Claims, 6 Drawing Sheets

SYSTEM FOR CONTROLLING THE COLOR OF COMPOUNDED POLYMER(S) USING IN-PROCESS COLOR MEASUREMENTS

This application is a Continuation of application Ser. No. 08/602,226 filed Feb. 15, 1996 now abandoned which is a division of application Ser. No. 08/378,993, filed Jan. 26, 1995, now U.S. Pat. No. 5,559,173, which is a continuation of application Ser. No. 08/131,232, filed Oct. 4, 1993 now abandoned.

RELATED APPLICATIONS

This application is related to patent application Ser. No. 08/131,231, entitled "Imaging color sensor", by Campo et al., filed Oct. 4, 1993, now abandoned, assigned to the assignee of the present invention and herein incorporated by reference.

FIELD OF THE INVENTION

This invention relates to the color of compounded polymer(s) and, more particularly, to a system for closed-loop feedback control of the color of the compounded polymer(s).

BACKGROUND OF THE INVENTION

Contemporary plastics are typically comprised of one or more base polymers or resins, one or more colorants or colorant additives, and other additives. Such additives may include, for example, fiberglass for structural reinforcement, flame retardants, plasticizers, or mold release agents. The plastics are manufactured by mixing these constituents, usually by machine, to form a substantially homogeneous polymer mixture. In this context, a substantially homogeneous compounded polymer mixture is distinguished from a polymer mixture having a substantially uniform color. In addition to the heat produced by mixing these constituents, termed "shear heat", other external heat may also be supplied. The resulting material, frequently produced in the form of strands, webs, bars, sheets or films, to name only a few possible shapes, may, after at least partial solidification of the mixture, then be pelletized to produce a final polymer product.

Experience has shown that the color of the resulting polymer product may depend upon several factors. These include, among others, the concentration and type of colorants, the base resins employed and their concentration by weight, the temperature history during mixing, and the ultimate degree of constituent inter-mixing achieved during processing. Thus, variations in color between polymer products may arise for a large variety of reasons. For example, color may vary among products due to polymer product formulation or recipe differences. Likewise, color variations may exist between lots for a given product formulation or recipe due to, for example, machine-to-machine differences. Furthermore, color differences may exist within lots due to changing raw material characteristics, changing operating conditions, and inaccuracies and other anomalies in processing, such as differences in the constituent feed rates. Thus, a need exists for a reliable and effective means or method of controlling the color of compounded polymer(s) while the compounded polymer(s) are in-process and, thus, bringing a production lot of the compounded polymer(s) to the desired color and substantially maintaining that color throughout the production run.

SUMMARY OF THE INVENTION

One object of the invention is to continually monitor the color of the compounded polymer or polymers during manufacture and automatically adjust colorant additive addition rates, or other constituent addition rates, to efficiently and quickly obtain the desired polymer color while the compounded polymers are still in-process. In particular, such measurements should occur before any pelletization and/or packaging.

Another object of the invention is to provide a system for controlling the color of the compounded polymer(s) and thereby reduce both compounder down time and scrap material production.

Yet another object of the invention is to maintain the color of the compounded polymer(s) within a desired specification throughout the production run while also accommodating varying or changing raw material properties and other variations in processing conditions.

Briefly, in accordance with one embodiment of the invention, a system for controlling the color of compounded polymer(s) comprises: a compounder for inter-mixing the constituents of the compounded polymer(s) to produce a substantially homogeneous mixture; a sensor for measuring the color of the substantially homogeneous mixture at predetermined intervals; a controller, responsive to the sensor, for determining the appropriate colorant additive addition rate(s); and a colorant additive feeder, responsive to the controller, for providing the colorant additive(s) to the mixture at rates substantially prescribed by the controller.

BRIEF DESCRIPTION OF THE DRAWINGS

The subject matter regarded as the invention is particularly pointed out and distinctly claimed in the concluding portion of the specification. The invention, however, both as to organization and method of operation, together with further objects and advantages thereof, may best be understood by reference to the following detailed description when read with the accompanying drawings in which:

DETAILED DESCRIPTION OF THE INVENTION

Figure 1:
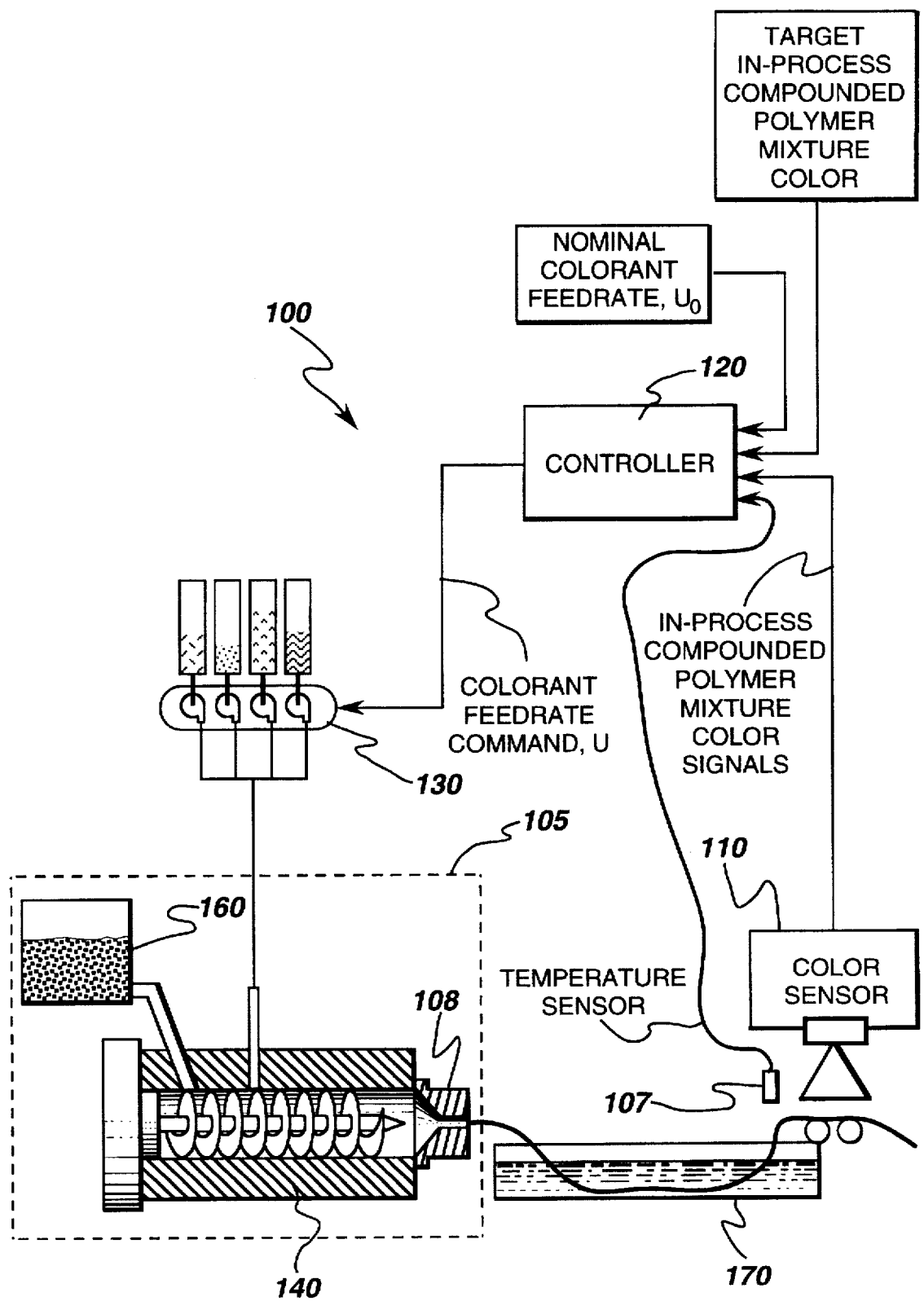
FIG. 1 is a schematic diagram illustrating one embodiment of a system for controlling the color of compounded polymer(s) in accordance with the invention.

Plastics, such as thermoplastic polymers or thermoset polymers, may be used in a number of different commercial products. Industries employing polymers include the printing industry, the paint industry, the fabric industry, and the plastic industry. In a number of these products and industries, the color of the polymer product may be important. In such industries, a manual procedure is typically used to adjust the amount of colorant(s) or colorant additive concentration(s) to achieve the desired polymer product color for a production run in which a polymer or several polymers are compounded. In the context of the invention, the term colorant or colorant additive refers to any additive to a mixture of polymer product constituents that affects the polymer product color by itself or in combination with the other constituents. This procedure usually involves preparing a blend of base resin(s) or polymer(s), colorant(s), such as, for example, solid pigments, liquid pigments or dyes, and other additive(s), according to a nominal recipe, sampling this blend, compounding the blend in a laboratory machine to generate a pelletized polymer product, injection molding the pellets to obtain a plaque of substantially uniform color, measuring the plaque color in a laboratory spectrocolorimeter, comparing the plaque color to the product "standard plaque," computing an addition of colorant(s) to correct the color, and adding this correction in colorant(s) to the blend.

This sequence is typically repeated until the laboratory scale machine produces a molded plaque of a nominally acceptable color. A sample of the suitably adjusted blend of resin(s), colorant(s) and other additives is then compounded on a production scale machine. Again pellet samples are collected, injection molded to produce plaques, measured with the spectrocolorimeter, and compared to the desired product standard. Any differences, which may arise from processing differences between the laboratory scale compounder and the production scale compounder, are again manually compensated by an addition of colorant(s) to the blend. Although the concentration of other constituents other than colorants may also be modified, typically this is not effective or economical for modifying the color of the polymer product. These adjustments continue in an iterative fashion until the desired product color is achieved on the production machine. Once the desired polymer product color is achieved, the entire blend is compounded without further adjustment. Because of the substantial time and effort involved in each of these colorant adjustments, it may be advantageous to reduce the number of adjustments required to achieve the desired polymer product color. For example, typically two hours is required to complete an iteration of the adjustment procedure on a production compounder.

Attempts have been made to provide accurate predictions of the effects of the addition of colorant(s) on polymer product color. These predictions may be provided by commercially available software tools based on various implementations of the Kubelka-Munk color theory, such as explained in Judd and Wyszecki, *Color in Business Science and Industry*, John Wiley & Sons, New York, 1975; Billmeyer, J. and Saltzman, M., *Principles of Color Technology*, John Wiley & Sons, New York, 1981; and Wyszecki and Stiles, *Color Science: Concepts and Methods, Quantitative Data, and Formulae*, 2d ed, John Wiley & Sons, New York, 1982. These software packages, such as, for example, MTS available from MTS Colorimetric, Cergy-Ponttoise, France, typically provide initial colorant loading or concentration recipes to match customer color requirements and are also used to facilitate the calculation of colorant addition adjustments to eliminate differences in color between a plaque molded from production samples and the "standard plaque." These programs typically require measurements of reflectance spectra from both the sample and standard plaques, and are typically used with dedicated spectrocolorimeters. Despite efforts to customize them for specific products or manufacturing sites, these programs generally are not able to provide an adequate prediction of the effects of colorant loading or concentration on polymer product color and several iterations of the color adjustment process are, therefore, often required even when these software tools are employed in the process to obtain the desired polymer product color. Thus, state of the art color adjustment procedures have several drawbacks. The procedures are time-consuming, require manual intervention, require extremely accurate predictions of polymer product color, often result in using excessive colorant or excessive colorant additions, and also provide no compensation for shifts in polymer product color that may occur during a production run.

FIG. 1 is a schematic diagram of an embodiment 100 of a system for controlling the color of compounded polymer (s) in accordance with the invention. System 100 includes: a compounder, 105, for compounding the polymer(s), colorant additive(s), and even other additive(s) to produce a compounded polymer mixture; a sensor, 110, for continually monitoring the color of the substantially homogeneous compounded polymer mixture, in-process, at predetermined intervals; a colorant additive feeder, 130, for providing one or more colorant additives to the compounded polymer mixture at substantially predetermined colorant addition rates, and a controller, 120, responsive to the sensor, for controlling the colorant addition rate of the colorant additive feeder for each colorant additive or for combinations of colorant additives. System 100 may further include a sensor 107, such as a thermocouple or an infrared radiation sensor, for measuring the temperature of the in-process compounded polymer mixture at substantially the same time that sensor 110 measures the color of the mixture. Likewise, a temperature sensor may measure the temperature of liquid bath 170, if desired. Controller 120 may be coupled to and responsive to such a temperature sensor and use the measured temperature to compensate the measured color or alternatively, the target color for the effect of temperature upon the color of compounded polymer mixture.

Compounder 105 may include, as illustrated, a base resin reservoir and feeder 160, and a production extruder 140. Nonetheless, other examples of compounding machines include kneading machines, mixers, including banbury type internal mixers, mixing rolls and single or twin screw extruders. Likewise, as suggested earlier, FIG. 1 illustrates liquid bath 170 for in-process cooling of the mixture after it exits the extruder, such as through an aperture in a die incorporated at one end of the extruder, as illustrated; however, such a bath, although convenient to solidify the in-process mixture rapidly, may be excluded from alternative embodiments. For example, air cooling may alternatively be employed. As illustrated, the colorant additive feeder or colorant feed system 130 is in physical association with the production extruder, in this embodiment by a channel, passage, or other material handling connection between the colorant additive feeder and the production extruder. In general, the base resin reservoir and feeder and colorant additive addition feeder may comprise any one of a number of materials handling apparatus, such as described in *Unit Operations of Chemical Engineering*, written by W. L. McCabe and J. C. Smith, and available from McGraw-Hill (1976). Extruder 140 mixes the polymer product constituents received from base resin supply 160, and from other sources, such as colorant additive addition feeder 130.

Likewise, other additives may be fed, such as fiber for reinforcement, flame retardant, etc. These may be fed, for example, from the same feeder that feeds the colorants or from a separate feeder, depending on the particular embodiment. Thus, various feeders may feed constituents to extruder 140, and the extruder mixes the constituents to provide the compounded polymer mixture.

As illustrated, colorant feeder 130 responds to colorant feed rate adjustments provided by controller 120. Colorant feed system 130 thus feeds additions of colorant(s) or colorant additive(s) into the production extruder, which mixes the constituents and thereby results in the adjustment of the in-process color of the compounded polymer mixture. In response to the controller, feeder 130 may either increase or reduce the rate of addition of colorant additives, thus, in many instances, conserving the use of such colorants and avoiding waste. As illustrated, the mixture may leave the production extruder through a die. The die may incorporate apertures of various shapes and sizes to produce various forms, such as cylindrical strands, webs, sheets, bars, pipes, or channels, to name a few possible shapes. In this particular embodiment, as suggested earlier, strands of material exit the die and are provided to liquid bath 170 in order to cool and partially harden the mixture. Typically, water will be employed. At this point in the process, and as illustrated, sensor 110 may obtain color information about the mixture from optical signals reflected from the product. These optical signals may be transformed by the sensor to electrical signals and provided to the controller in order to determine one or more adjustments to the colorant addition feed rate.

It will now be appreciated that in general the color of an object, such as a polymer mixture or polymer product, may be specified by no less than three independent color parameters or color signal values. See, for example, the previously referenced Judd and Wyszecki text. Each of these three parameters or signal values may, therefore, be adjusted individually to affect color and in the context of the invention these three parameters are referred to as the three dimensions of color space.

For the embodiment of a system for controlling the color of compounded polymer(s) illustrated in FIG. 1, system 100 may be initialized with a target product color and a nominal colorant feed rate, typically resulting in a particular amount of colorant per pound of final product. This procedure is performed once and thus provides the nominal starting point or initialization of the system. Once provided an initial nominal combination of polymer(s), and colorant(s) or colorant additive(s), the system may comprise hardware and software components to implement continual colorant additive adjustments to subsequently realize the desired polymer product color during production or compounded polymer processing. Likewise, the hardware and software components may be implemented so as to determine the initialization or initial formulation as well.

Although many different procedures may be employed to provide an initial starting point for the system, such as by a completely automated procedure, the "closer" the system initialization places the system operating point to the desired in-process polymer mixture color, the more quickly the desired in-process color will be realized. Nonetheless, one advantage of a system for controlling the color of compounded polymer(s) in accordance with the invention is the fact that the initial formulation may not initially achieve the desired in-process color and the system may automatically adjust the formulation to obtain the desired target color in-process. In order to achieve this initialization more effectively, one possible initialization methodology is provided hereinafter.

A polymer product formulation may be provided in terms of desired color, base resin composition or concentration, colorant additive composition or concentration, and other additive concentration. Thus, a nominal product specification or formulation requires selecting the appropriate additive(s), colorant additive(s) and polymer(s) in nominal concentrations which theoretical computations indicate will achieve the desired target polymer product color based on the Kubelka-Munk theory, while also providing the flexibility to adjust the polymer color, as the need arises during processing, by varying the relative amount(s) of colorant additive(s). It will be appreciated that the relative amount of polymer(s) may theoretically also be adjusted to affect color, although this may not be practical or economical.

Likewise, an appropriate target color for the polymer product, as measured by sensor 110, must be specified. The problem is made more complex because of differences between various methods of measuring color and the effects of injection molding on polymer product color. Therefore, the target color for the compounded polymer product as measured by sensor 110 may not be the same color as the "standard" plaque for the polymer product.

Obtaining a nominal product formulation of selected polymer(s), colorant(s), and other additive(s) is conventional and may be performed by any one of a number of commercial available products, such as the aforementioned MTS. Other examples of commercially available software include OPTIMATCH™ Plastics Color Formulation System available from MacBeth, a division of Kollmorgen, Corp., in Newburgh, N.Y. The result of such a procedure is a list of n colorant additive(s) and nominal concentration(s), $x_{i0}$, for each, where i is a non-zero integer up to n. Although the concentration of the polymers or base resins and other additives may also be specified per pound of final product, these concentrations are usually not adjusted beyond the initial formulation or at least not in-process, unlike colorant concentrations.

Ideally, this recipe would result in a polymer product with a reflectance spectra or spectral reflectance curve substantially identical to that of the polymer product standard, that is, a non-metameric match, although this is unlikely to occur in actual practice. Instead the predicted spectral reflectance may correspond to three color space parameters or signal values, $X_o$, $Y_o$, and $Z_o$. It will be appreciated that for a given illuminant, the color of an object may be decomposed into three such signal values, such as described in the aforementioned Judd and Wyszecki text and as previously described regarding the three dimensions of color space. For convenience, in the context of the invention, the tristimulus signal values indicating the color of an object are employed, although the invention is not limited in scope to this particular color signal formulation. For example, transformations may be employed to produce other color signal formulations. Likewise, RGB color signals (i.e., red, green and blue color signals such as those produced by an RGB video camera and defined by National Television System Committee (NTSC) standards as set forth, for example, in *Television Engineering Handbook*, K. Blair Benson, Editor, McGraw-Hill, 1986) may alternatively be employed, such as described in aforementioned U.S. Pat. No. 5,559,173, issued Sep. 24, 1996.

One aspect of the nominal colorant formulation is obtaining a formulation which allows flexible modification of the nominal recipe to produce "arbitrary" colors "near" the target polymer product color. This feature is not provided or even recognized by any of the known commercial software product formulation tools. Thus, one aspect of a system for controlling the color of compounded polymer(s) in accordance with the invention includes a methodology for providing a quantitative measure of the "controllability" of the color of the compounded polymer mixture about a particular nominal recipe based on properties of the formulation obtained from a linearized version of the Kubelka-Munk equations, as described hereinafter. This measure provides an indication of the ease with which the nominal recipe may be modified to produce arbitrary colors in a neighborhood around the target polymer product color. Such controllability, and its associated quantative measure, is useful in a system for controlling the color of in-process compounded polymer(s) in that disturbances, changes, or anomalies in operating conditions may shift the color of the polymer mixture in arbitrary directions away from the target color during production or compounded polymer processing. In order to correct these in-process color shifts, the feedback controller in a system for controlling the color of compounded polymer(s) in accordance with the invention has the capability to shift the in-process mixture color in the reverse direction, back "towards" the target color, by adjusting one or more colorant addition feed rates.

The Kubelka-Munk theory provides a nonlinear relationship between colorant additive concentrations, $c_i$, and "color space" (i.e., any well-known 3-dimensional color scale, such as any of those defined by the international standards organization known as CIE (Commission International de l'Eclairage) which includes tristimulus values X, Y, Z and 1976 CIE L*a*b* values L, a, b) of the form $$X = f_1(c_1, c_2, \ldots, c_n) \quad (1)$$

$$Y = f_2(c_1, c_2, \ldots, c_n) \quad (2)$$

$$Z = f_3(c_1, c_2, \ldots, c_n) \quad (3)$$

where X, Y, Z are the previously described color space parameters or signal values and $f_i$ are mathematical relationships that depend, at least in part, on the chosen light source or illuminant and the "standard observer", as explained in greater detail in Judd and Wyszecki.

In the case that the color space of interest is defined by CIE tristimulus values, equations (1), (2), (3) could take the form:

$$X = k \sum_{\lambda=380}^{780} R(\lambda)S(\lambda)\bar{x}(\lambda) \quad (1A)$$

$$Y = k \sum_{\lambda=380}^{780} R(\lambda)S(\lambda)\bar{y}(\lambda) \quad (2A)$$

$$Z = k \sum_{\lambda=380}^{780} R(\lambda)S(\lambda)\bar{z}(\lambda) \quad (3A)$$

where k is a normalizing constant given by $$k = \frac{100}{\sum_{380}^{780} S(\lambda)\bar{y}(\lambda)},$$

$R(\lambda)$ is the sample reflectance at wavelength $\lambda$, in percentage,
$S(\lambda)$ is the illuminant's relative spectral power at wavelength $\lambda$, and
$\bar{x}(\lambda)$, $\bar{y}(\lambda)$, $\bar{z}(\lambda)$ are the color matching functions for the selected observer evaluated at wavelength $\lambda$.

As is well known in the art, the reflectance $R(\lambda)$ for a sample containing one or more colorants can be determined for a given sample from the ratio of the absorption and scattering coefficients of the mixture via $$R = 1 + \left(\frac{k}{s}\right)_{mix} - \left[\left(\frac{k}{s}\right)_{mix}^2 + 2\left(\frac{k}{x}\right)_{mix}\right]^{1/2} \quad (4A)$$

where the ratio $$\left(\frac{k}{s}\right)_{mix}$$

is given by $$\left(\frac{k}{s}\right)_{mix} = \frac{\sum_{i=1}^{n} c_i k_i}{\sum_{i=1}^{n} c_i s_i} \quad (5A)$$

where
$C_i$ is the weight fraction of colorant i in the sample,
$k_i$ is the absorption coefficient for colorant i in the sample, and
$s_i$ is the scattering coefficient for colorant i in the sample.

It is important to note that many other "color spaces" can be derived from the CIE tristimulus values X, Y, Z defined here. These are well known in the art and include, among others: CIE L*, a*, b*; CIE L*, u*, v*; FMC; FMC-II, and CMC. It will be appreciated that any of these well-defined transformations of X, Y, Z could be applied and the following develppment would proceed unmodified in principle.

Presuming that CIE tristimulus, X, Y, Z is the color space of interest, the expansion of these relationships in a conventional Taylor series about a nominal colorant recipe $c_{10}, \ldots, c_{n0}$, provides the following simplified mathematical representation.

$$\begin{bmatrix} X - X_0 \\ Y - Y_0 \\ Z - Z_0 \end{bmatrix} = G \begin{bmatrix} c_1 - c_{1_0} \\ c_2 - c_{2_0} \\ \cdot \\ \cdot \\ c_n - c_{n_0} \end{bmatrix} + O(c - c_0)^2, \quad (4)$$

where $X_0$, $Y_0$, and $Z_0$, are, the nominal color space values. In a particular embodiment, these nominal color space values could be tristimulus signal values. $O(c-c_0)^2$ denotes mathematical terms of "order" two and above, and the matrix, G, of steady state gains is provided by:

$$G = \begin{bmatrix} \frac{dX}{dc_1} & \frac{dX}{dc_2} & \cdots & \frac{dX}{dc_n} \\ \frac{dY}{dc_1} & \frac{dY}{dc_2} & \cdots & \frac{dY}{dc_n} \\ \frac{dZ}{dc_1} & \frac{dZ}{dc_2} & \cdots & \frac{dZ}{dc_n} \end{bmatrix} \quad (5)$$

For small changes in the nominal recipe, the higher-order terms in equation (4) should not contribute significantly to changes in the in-process mixture color and the gain matrix, G, characterizes the effects of colorant additive concentration or loading changes on the in-process mixture color. Thus, arbitrary changes in the in-process color around, or in the vicinity of, the target polymer product color may be achieved if G has full row rank. The matrix G provides a quantitative measure of the "difficulty" in achieving the colorant loading or concentrations corresponding to modifications in the desired in process color. This quantitative measure is related to the property of matrix G referred to as the "condition number" and is explained in more detail in

*Matrix Computations*, by C. H. Golub and C. F. Van Loan, available from Johns Hopkins University Press (1983) and *Linear Algebra and its Applications*, by G. Strang, available from Academic Press (1980). The condition number, as is well known in the art, is the ratio of the largest singular value of a matrix to the smallest non zero singular value of the matrix. In those situations where G has an infinite condition number, G has rank deficiency. When the condition number of G is large with respect to unity, solutions to the linear system of equations (4), with higher order terms neglected, exist but are difficult to obtain numerically and the resulting solution is likewise sensitive to changes in the entries in G. See, for example, the aforementioned Golub and Van Loan text. Since inaccuracies in G are inevitable as a result of limitations in the Kubelka-Munk theory and for other reasons, this situation implies a formulation which, in the context of the invention, is "practically unadjustable." That is, in relation to the amount of colorant necessary, the in-process mixture color is difficult to adjust or modify. Thus, the formulation is either actually unadjustable or practically unadjustable. When the condition of G is moderate relative to one, however, reliable solutions to the linear system of equations are relatively easy to obtained numerically. For example, a condition number above 1000 is probably excessive, whereas a condition number below 100 is probably not. Nonetheless, it will now be appreciated the acceptability of the condition number may depend, at least in part, on the amount of uncertainty associated with the entries of G.

The condition number, therefore, provides a quantitative measure of the in-process color formulation flexibility. Whether a nominal recipe is practically unadjustable in the context of the invention in one approach may be resolved by incorporating the condition number measure during colorant additive formulation in conjunction with other colorant formulation techniques, such as those provided by commercially available polymer product color formulation software.

As previously indicated, in determining the initial product formulation, a second aspect is the identification of an appropriate target for the product color, as measured in-process by sensor 110. Likewise, depending on the particular application of a system for controlling the color of compounded polymer(s) in accordance with the invention, the target color may be changed or modified during a single production run. Two alternative approaches for providing a target product color are either preparing a "production standard" or developing a transformation that relates the sensor measurements to the ultimate plaque or desired polymer product color.

A production standard is a physical sample of the polymer product generated in a previous lot which, when molded, results in a plaque identical to the polymer product color standard. This production standard is then measured by sensor 110 and its color, as measured, used as the target color for production. Depending upon the type of sensor employed, it may be useful to measure both the physical production standard and the in-process polymer product or compounded polymer mixture substantially simultaneously. Thus, in such an embodiment, sensor 110 need only provide a differential color measurement and need not produce absolute color measurements of significantly high accuracy and precision. By yet another technique, it may be sufficient to measure the production standard when the lot is begun, store the generated measurement signals and use these stored signals as the control target throughout the production run.

A second approach to the determination of target color for sensor 110 involves developing a transformation which relates the measured color of the in-process polymer product, such as strands, or webs, to the color of the plaque molded under known conditions from that polymer product. Many aspects of the operating environment may account for this color difference, such as, for example, the temperature of the polymer mixture at the time of color measurement. Thus, it may be desirable to include a temperature sensor to measure the temperature of the polymer mixture, or a variable correlated with this temperature, at the time of measurement. Likewise, it will be appreciated that either the target color or the measured color of the compounded polymer mixture may be adjusted or compensated to account for any color variations due to temperature. Once a transformation is obtained, the inverse of this transformation may then be applied to the polymer product standard plaque color to produce a target color for the signal measurements obtained by the sensor. This approach would be most effective where a consistent relationship exists between polymer product color measured in-process and the plaque ultimately obtained from that product. It will now be appreciated that once a plaque or polymer product color standard is available, the initialization of a system for controlling the color of compounded polymer(s) in accordance with the invention may be completely automated.

As illustrated in FIG. 1, system 100 includes sensor 110 which measures, in-process, compounded polymer color. Depending on the type of compounding machine used, the product may be in the form of, for example, multiple thin strands, a flat web, or sheets. The color sensor may take a number of different forms. Any sensor capable of repeatedly measuring the polymer mixture color may be employed, including tristimulus (3-filter) colorimeters, spectrophotometric colorimeters, and electronic video or still frame camera-based systems. For example, a generic RGB video camera may suffice. One color sensor embodiment is described in more detail in aforesaid U.S. Pat. No. 5,559,173, issued Sep. 24, 1996 entitled "Imaging Color Sensor." In any case, the sensor should have the capability of producing three-dimensional signal measurements in real-time that provide color information.

Another component of a system for controlling the color of compounded polymer(s) includes colorant additive feeder 130. Potential feeding methods include: feeding powders or pellets directly to the compounder, such as at the feed throat; feeding single pigment dispersion pellets to the compounder, such as at the feed throat; feeding liquid colorants to the compounder, such as at the feed throat; or injecting liquid colorants into the compounder at other locations than at the feed throat. Examples of devices adequate for handling such liquid or solid materials include belt feeders, vibratory feeders, loss of weight feeders, pneumatic conveyers, peristaltic pumps, gear pumps, positive displacement pumps and centrifugal pumps, to name only a few. Such a feeder should have the capability to feed separate streams of colorants to the compounding machine. Nonetheless, particular colorants may constitute a pre-mixed blend of constituents. Furthermore, it may prove economical to pre-mix a substantial portion of the mixture and only vary, through closed loop feedback control, a selected number of colorants in relatively small amounts to obtain the desired target color. It is desirable that the feed rate for each colorant additive be independently adjustable from the feed rate for any other colorant additive so that the colorant additive feeder may be responsive to the controller to provide one or more colorant additives to the compounded polymer(s) mixture at independently adjustable, substantially predetermined, colorant addition rates.

Yet another component of a system for controlling the color of compounded polymer(s) in accordance with the invention is controller 120, which determines appropriate colorant addition rates in response to changes in the sensor signals that indicate changes in the measured in-process polymer mixture color. This feedback control may be implemented using conventional process control hardware, such as programmable logic controllers, (PLCs) or distributed control systems (DSCs). For effective operation, one embodiment of a system for controlling the color of compounded polymer(s) may employ a set of discrete time difference equations, such as may be used to realize linear, time-invariant feedback control. It will be appreciated, however, that any one of a number of different feedback control techniques may be employed, such as, for example, fuzzy logic feedback control, such as described in *Fuzzy Logic and Control: Software and Hardware Applications*, edited by M. Jamshidi, N. Vadiec, and T. J. Ross, and available from Prentice Hall (1993), or neural network feedback control, such as described in *Neural Networks for Control*, edited by Miller, Sutton, and Werbos, and available from MIT Press (1990). A neural network closed loop feedback control computes changes in pigment concentrations based on sensor values using a highly interconnected set of simple computing units (known as "neurons" in the prior art). Similarly, a fuzzy logic closed loop feedback control constitutes another way of developing a relationship between color signal values and required pigment concentration adjustments using what are known as fuzzy sets to define the sensor values and pigment levels, and simple rules for defining the mapping of sensor values within a given range to pigment adjustments.

Fuzzy logic itself is a theoretical framework in which imprecise or qualitative knowledge can be collected and manipulated; it is particularly suited to capturing expert knowledge expressed in linguistic terms and applying it in a systematic way. Its primary aim is to provide a formal, computationally-oriented system of concepts and techniques for dealing with modes of reasoning which are approximate rather than exact. It is a generalization of traditional (or "crisp") logic which employs rules relating an antecedent and consequent in the form if (antecedent) then (consequent)

in which the anteedent and consequent can take on only the values TRUE and FALSE such as, for example, if $\Delta E<1$ then color is acceptable.

Fuzzy logic provides a framework for dealing with antecedents and consequents which correspond to imprecisely defined conditions such as, for example, if color is too light then add more dark pigment.

Nonetheless, the particular embodiment of this invention is based on a dynamic model relating changes in colorant or colorant additive feed rates to changes in compounded polymer color measured in-process. This relationship may be based upon a mathematical model providing a description of the signals that may be produced during a production run to represent polymer product color, such as provided hereinafter. In this particular embodiment, the controller is implemented so as to provide a single adjustable parameter, selected externally, to specify the desired closed-loop speed of response of the system, although the scope of the invention is not limited in this respect.

Figure 2:
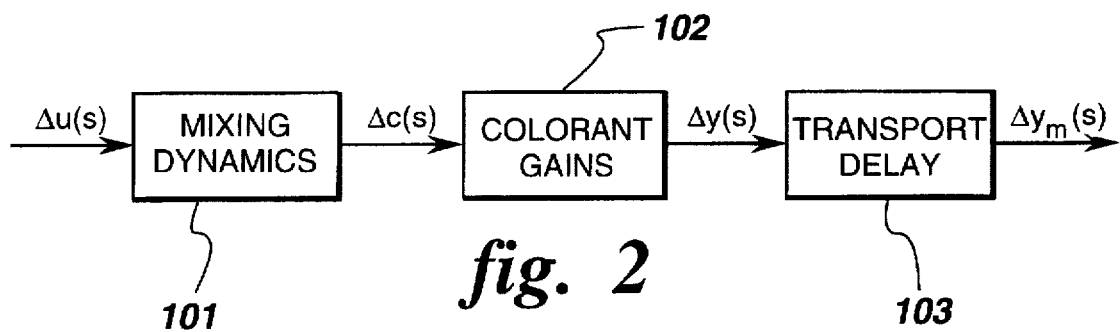
FIG. 2 is a block diagram illustrating a relationship between a polymer compounding process and signals representing the color of the compounded polymer(s).

A technique to accomplish this is now provided. To provide a useful technique for closed loop feedback control, assumptions are first made regarding: 1) the effects of colorant feed rate changes on colorant concentration in the polymer mixture; 2) the effects of colorant concentration on the polymer mixture color; and 3) the time delay associated with transportation of the polymer mixture from the compounder to the sensor. It will now be appreciated that these assumptions may not reflect the precise operation of the system; however, these assumptions have proven suitable for effective operation of a system for controlling the color of compounded polymer(s) in accordance with the invention. FIG. 2 is a block diagram illustrating this approach in which signals provide color information at different points in the compounding process.

It is assumed, for the sake of convenience, that the colorants or colorant additives do not react or interact in the compounder. As a result, the colorant mixing dynamics, block 101 in FIG. 2, may be described by the following frequency domain matrix equation:

$$\begin{bmatrix} \Delta c_1(s) \\ \Delta c_2(s) \\ . \\ . \\ . \\ \Delta c_n(s) \end{bmatrix} = \begin{bmatrix} M_{11}(s) & 0 & \ldots & 0 \\ 0 & M_{22}(s) & & \\ . & & & \\ . & & & \\ . & & & \\ 0 & & & M_{nn}(s) \end{bmatrix} \begin{bmatrix} \Delta u_1(s) \\ \Delta u_2(s) \\ . \\ . \\ . \\ \Delta u_n(s) \end{bmatrix} \quad (6)$$

where:

s is the Laplace transform variable;

$\Delta c_i(s)$ $\underline{\Delta}c_i(s)-c_{i_0}$ are deviations (from nominal) in the colorant concentrations at the compounder exit;

$\Delta u_i(s)$ $\underline{\Delta}u_i(s)-u_{i_0}$ are deviations (from nominal) in the colorant feed rates; and $M_{ii}(s)$ are single-input single-output transfer functions describing the mixing dynamics for each colorant.

Under this approach, the diagonal elements in equation (6) above would be substantially equal if all colorants were fed to the compounder at the same location and in the same manner. Likewise, the off-diagonal elements in equation (6) above are zero based on the assumption that the colorants do not interact. Transfer functions describing the mixing dynamics, and comprising the diagonal elements of M(s), may be determined by conventional system identification techniques, such as described in, *System Identification: Theory for the User*, by L. Ljung and available from Prentice-Hall, Inc. (1987). Typically, for any given operational system this information may be obtained by performing open loop production runs on the compounder. Likewise, this process of system identification may be automated. Values for a 28 millimeter Werner & Pfleiderer twin screw extruder are provided later in this specification; however, it will be appreciated that the invention is not restricted in scope to embodiments employing this particular compounder or extruder. Colorant dynamics may be obtained for any compounder in the conventional manner described.

Likewise, the effect of colorant loading or concentration on polymer mixture color, illustrated by block 102 in FIG. 2, is provided below by equation (4) where high order terms are neglected. In particular, $$\Delta y(s) = G \Delta c(s) \quad (7)$$

where $$\Delta y(s)\Delta = \begin{bmatrix} X(s) - X_0 \\ Y(s) - Y_0 \\ Z(s) - Z_0 \end{bmatrix}$$

represents the deviation of the in-process polymer product from the target polymer product color for the production run.

Finally, the transportation delay, illustrated by block 103 in FIG. 2, may be described by the following equation:

$$\Delta y_m(s) = e^{-sT} \Delta y(s) \tag{8}$$

where $\Delta y_m(s)$ is the in-process measurement of polymer product color, relative to the target color, as measured by sensor 110, and T is the delay in seconds between the time the mixture exits the compounder and the time its color is measured by the sensor.

Combining equations (6), (7), and (8), provides the following Laplace transform description of the signals providing color information obtained during the polymer compounding process.

$$\Delta y_m(s) = GM(s) e^{-sT} \Delta u(s) \tag{9}$$

Figure 3:
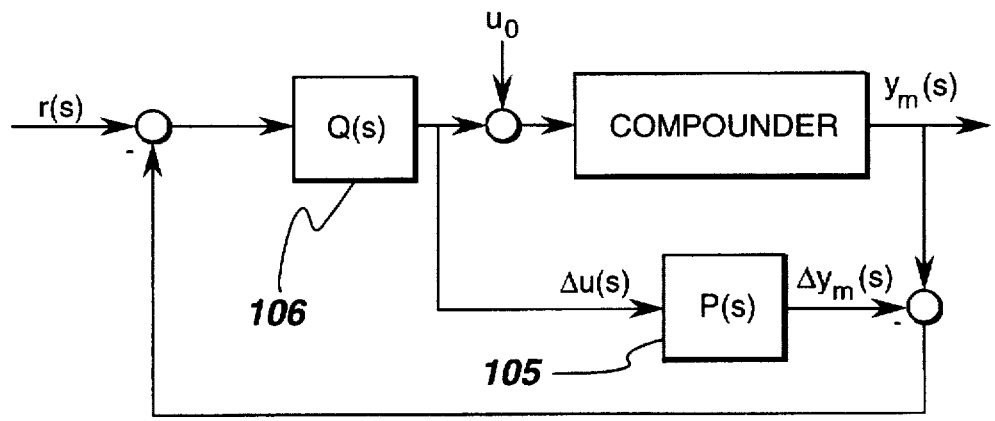
FIG. 3 is a block diagram illustrating one embodiment of a controller for a system for controlling the in-process color of compounded polymer(s) in accordance with the invention.

Closed loop feedback control of the compounding process utilizing this relationship is illustrated in FIG. 3. In block 105, P(s) denotes the process producing signals providing color information according to equation (9) above, while r(s) denotes the target color for the product as measured by the sensor, $y_m(s)$ denotes the compounded polymer color sensed in-process, and Q(s), in block 106, represents an implementation of a linear, time invariant feedback controller.

Figure 4:
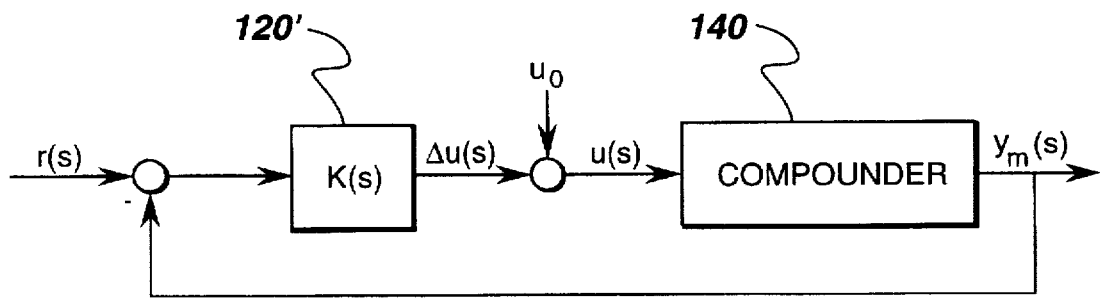
FIG. 4 is a block diagram illustrating another implementation of the embodiment illustrated in FIG. 3.
Figure 5A:
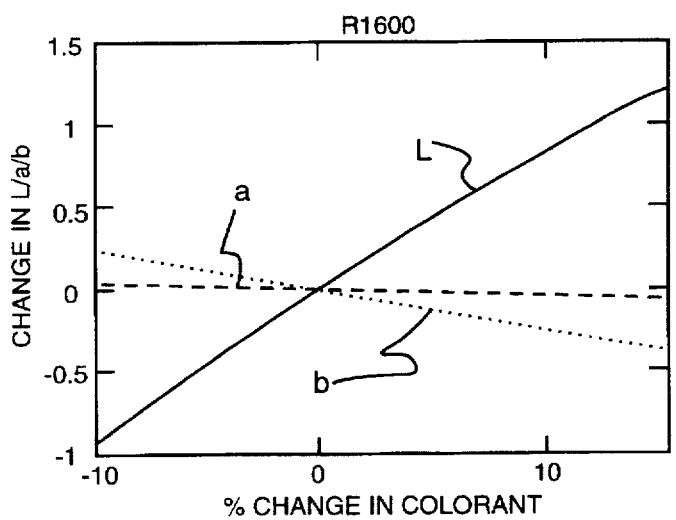
FIGS. 5a–5e are, respectively, plots illustrating the change in CIE Laboratory color parameters due to a change in the amount of the particular colorant for a nominal formulation of GE NORYL color number 50133.
Figure 5B:
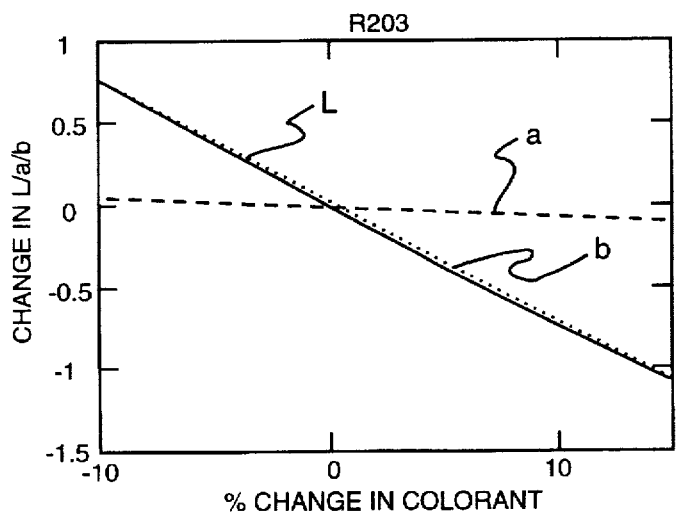
Figure 5C:
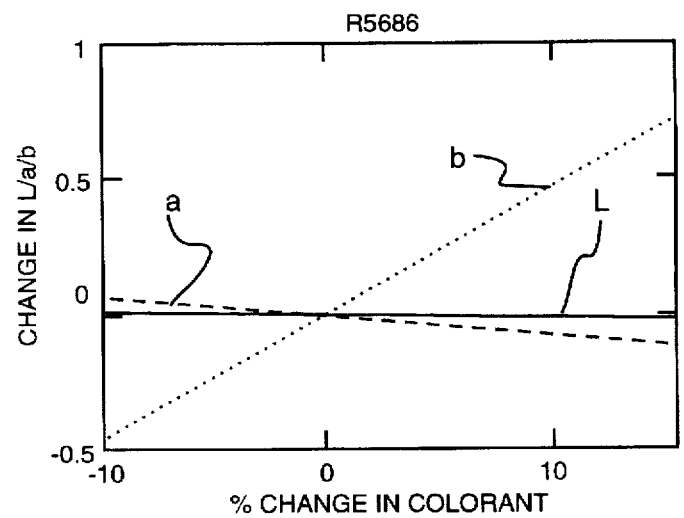
Figure 5D:
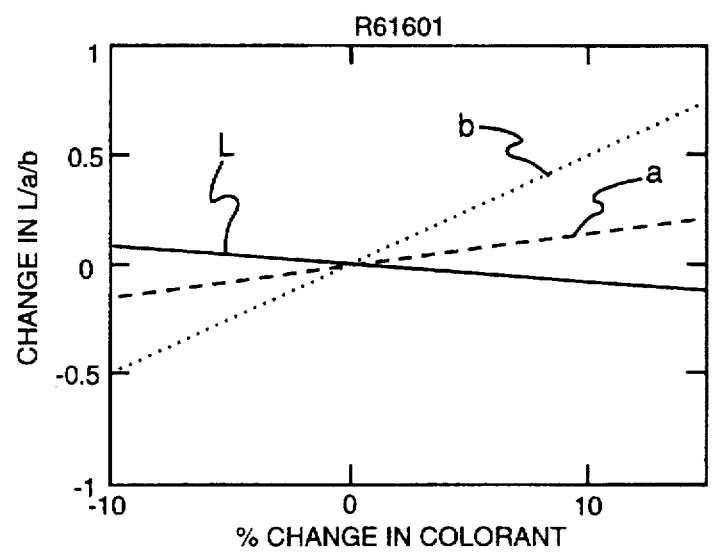
Figure 5E:
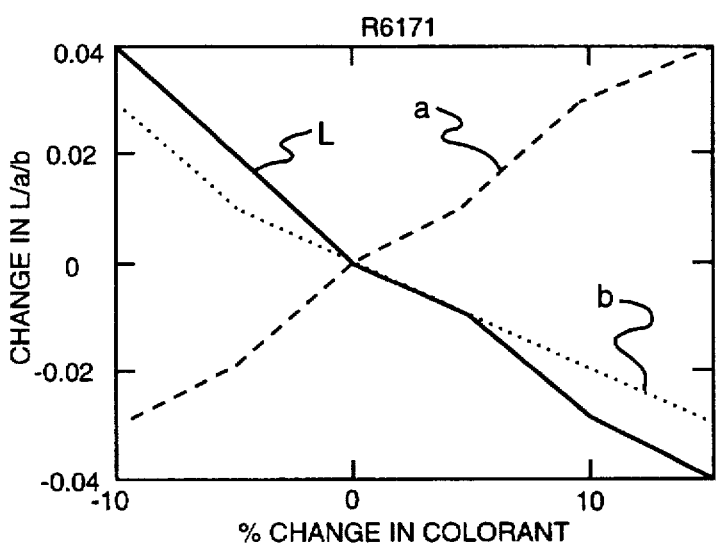

Having described the signals that may be provided by a system for controlling the color of in-process compounded polymer(s) in accordance with the invention, the remaining portion of the controller may be obtained from the P(s) provided in equation (9) using conventional control theory, such as described in Morari M., and Zafiriou E. Z., *Robust Process Control*, Prentice-Hall, Inc. (1989). Therefore, feedback control corresponding to P(s) may be given by $$Q(s) = G^{-1} M\_^{-1}(s) F(s) \tag{10}$$

where $M\_(s)$ is the minimum phase portion of M(s) and F(s) is a low pass filter used to shape the desired closed loop system response, such as described in the aforementioned *Robust Process Control*. This feedback control may be implemented more conveniently as illustrated in FIG. 4, where in block 120', corresponding to controller 120 in FIG. 1, $$K(s) = Q(s)(I - P(s)Q(s))^{-1} \tag{11}$$

Likewise, it may be convenient to use a Pade approximation to the transportation delay in equation (8) above.

It may be demonstrated that the choice of F(s) determines, at least in part, closed loop system behavior. In particular, the closed loop relationship between r(s) and $y_m(s)$ is given by $$\frac{y_m(s)}{r(s)} = P(s) Q(s), \tag{12}$$

-continued $$= e^{-sT} M(s) M^{-1}(s) F(s). \tag{13}$$

Likewise, where M(s) is minimum phase this simplifies to $$\frac{y_m(s)}{r(s)} = e^{-sT} F(s). \tag{14}$$

Typically, F(s) may take the form $$F(s) = \begin{bmatrix} \frac{1}{\epsilon s + 1} & 0 & 0 \\ 0 & \frac{1}{\epsilon s + 1} & 0 \\ 0 & 0 & \frac{1}{\epsilon s + 1} \end{bmatrix}, \tag{15}$$

and in this particular embodiment the single parameter $\epsilon$ determines in part the closed loop speed of response with a smaller $\epsilon$ corresponding to a faster closed loop system response.

In summary, based on the previous discussion, the controller may be specified more precisely based upon the identification of the diagonal elements in equation (6) and T in accordance with equations (10) and (11). This will depend in part upon the particular implementation of the system, including hardware. Likewise, this system identification process, including specifying M(s) and G, may be automated if desired. One particular embodiment of a system for controlling the color of compounded polymer(s) in accordance with this invention employing commercially available hardware is provided hereinafter. However, the invention is not restricted in scope to this particular implementation. For a given implementation, the controller, for example, may be specified in the manner previously illustrated. Likewise, a different or more complex description of the signals providing color information for such a system may be employed as part of the controller. This approach previously described provides a continuous time or continuous signal controller based on the parameter, $\epsilon$. Likewise, methods, such as described in Astrom, K. J. and Wittenmark, B., *Computer Controller Systems Theory and Design* Prentice-Hall, Inc., (1984), may then be employed to transform this continuous process controller into a discrete time process controller suitable for implementation on conventional process control hardware. Likewise, it may be desirable to customize the closed loop feedback control for applications with different system response requirements.

Colorants R1600, R61601, R6171 R5686, and R203 may be employed to formulate GE NORYL color number 50133 using MTS software. FIGS. 5a to 5e show changes in product color CIE laboratory color parameters or signal values L, a, and b, derived from the MTS software, for predetermined changes in the particular colorant. As set forth by the Commission International de l'Eclairage as the CIE 1976 L*a*b* Color Space, L defines the Lightness axis $$L = 116 (Y/Y_o)^{1/3}$$

a defines the red green axis $$a = 500 ((X/X_o)^{1/3} - (Y/Y_o)^{1/3})$$

b defines the yellow blue axis $$b = 200 ((Y/Y_o)^{1/3} - (Z/Z_o)^{1/3})$$

where $X_o$, $Y_o$ and $Z_o$ are the tristimulus values of the perfect white for a given illuminant, and X, Y and Z are the tristimulus values for the color. From these graphs the matrix G, provided below, was obtained based on the slope of the curves illustrated in FIGS. 5a to 5e.

$$G = \begin{bmatrix} .0847 & -.0732 & -.0031 & -.0014 & -.0083 \\ -.0040 & -.0062 & .0028 & -.0072 & .0143 \\ -.0222 & -.0698 & -.0022 & .0457 & .0505 \end{bmatrix}. \quad (16)$$

Figure 6A:
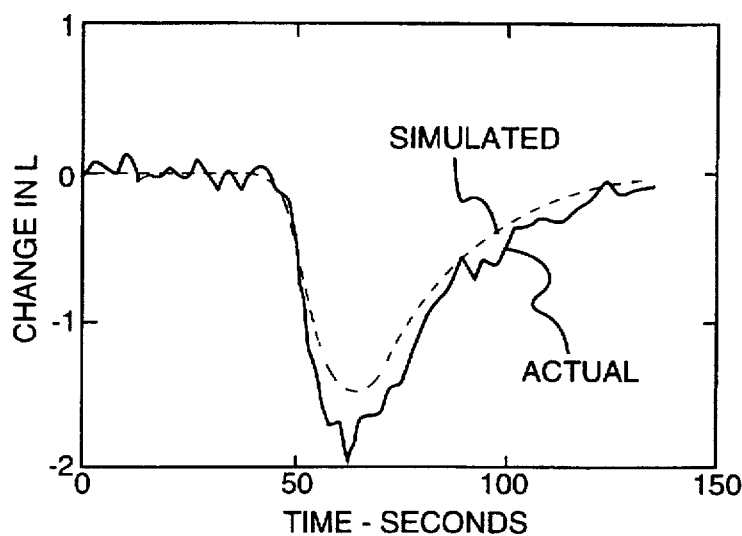
FIGS. 6a to 6c are, respectively, plots illustrating an actual and simulated open loop pulse response for one embodiment of a system for controlling the color of compounded polymer(s) in accordance with the invention.
Figure 6B:
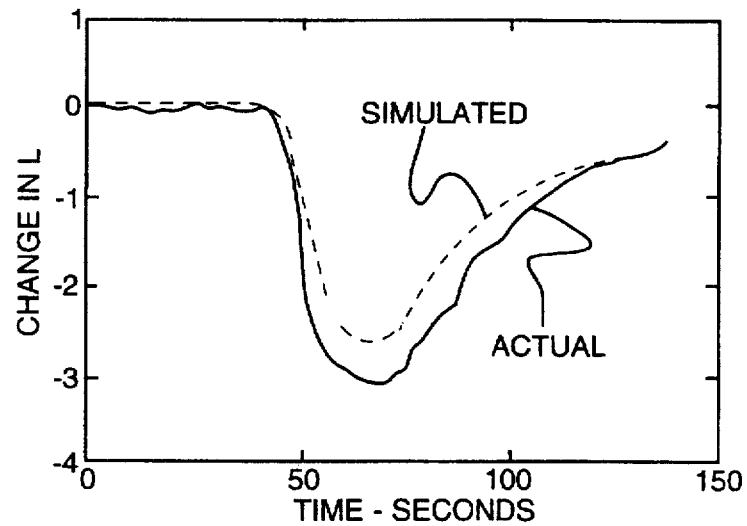
Figure 6C:
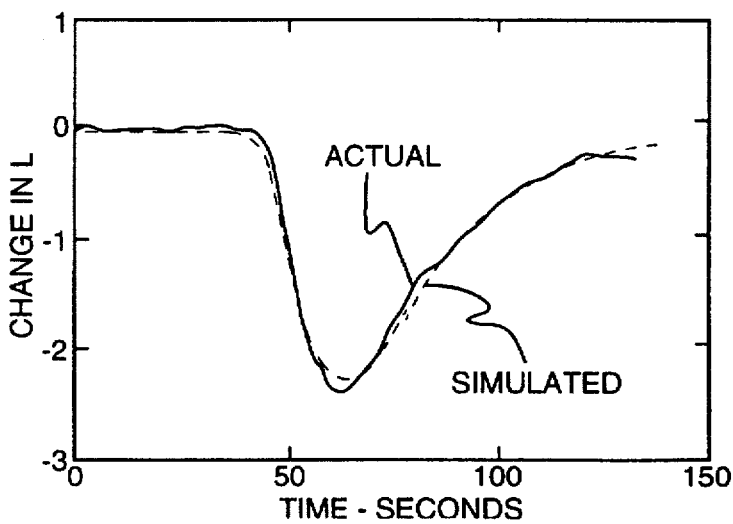

An embodiment of a system for controlling the color of compounded polymer(s) in accordance with the invention may use a 28 millimeter Werner & Pfleiderer extruder to compound GE GEMAX II. FIGS. 6a, 6b, and 6c show simulated responses in conjunction with the actual response for a pulse input of blue-green colorant to the 28 millimeter Werner & Pfleiderer twin screw extruder. This data was collected to determine linear dynamic colorant mixing dynamics to provide the diagonal elements of equation (6). Using the MATLAB System Identification Tool Box Software, as described in *MATLAB System Identification Toolbox User's Guide*, by L. Ljung, and available from the Mathworks, Inc. (1991), Natick, Mass., a sixth order dynamic model was obtained from the experimental data, using the equation error method. For this compounder, M(s) is diagonal with entries given by equation (17) below.

$$M_{ii}(s) = \frac{s^6 + 3.33s^5 + 3.47s^4 - 2.41s^2 - 1.61s - 0.335}{s^6 + 2.55s^5 + 4.94s^4 + 1.38s^3 + 0.251s^2 + 0.0193s + 0.000533}, \quad (17)$$

where i=1, 2, 3. Likewise, a transportation delay of approximately 40 seconds is illustrated by the plots.

Figure 7A:
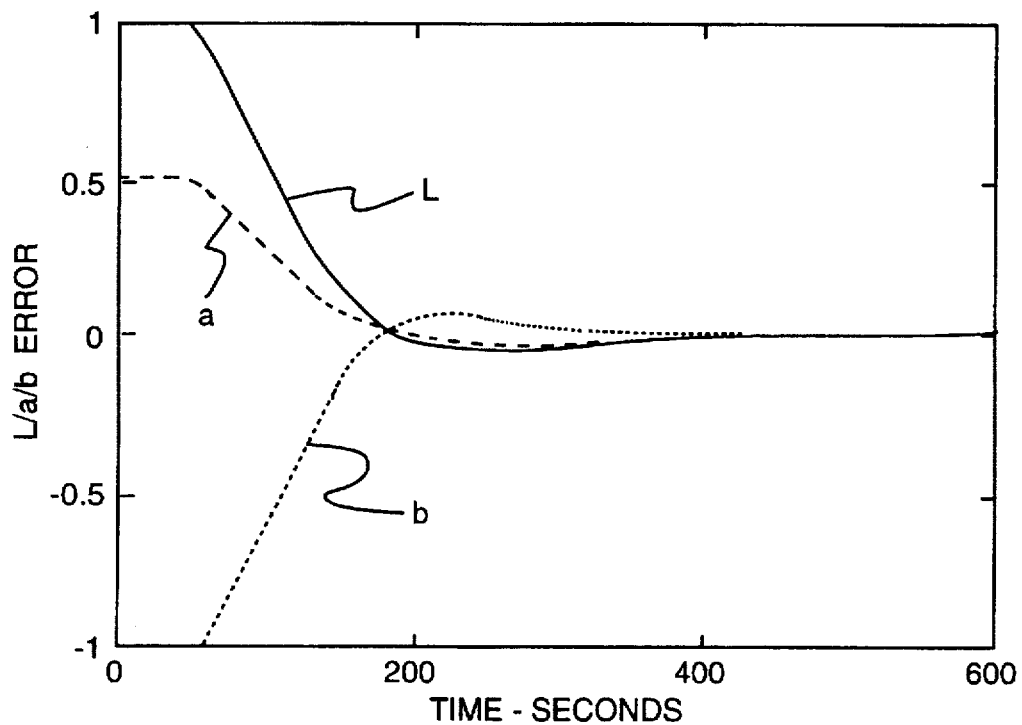
FIGS. 7a and 7b are, respectively, plots illustrating a simulation of a closed loop response to an initial color error for the embodiment of a system for controlling the color of compounded polymer(s) in accordance with the invention having the open loop pulse responses illustrated in FIGS. 6a to 6c.
Figure 7B:
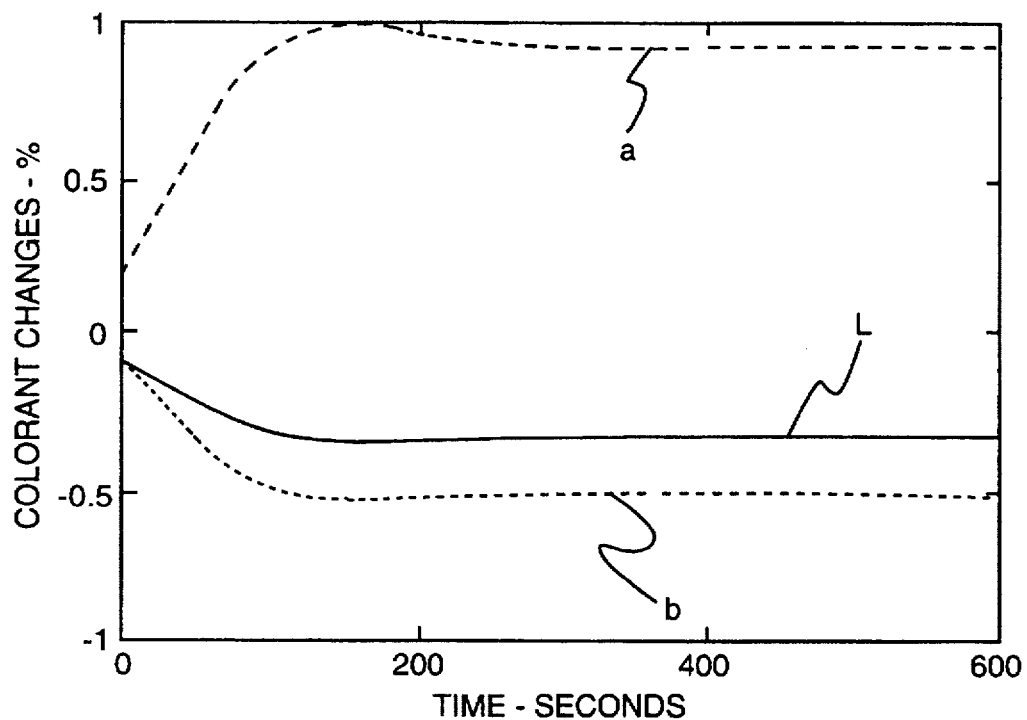

The information for an embodiment of the controller in accordance with equation (10) is provided by equation (16) and equation (17) above for the 28 millimeter W&P machine. For this particular embodiment, equation (10) was implemented with ε=100. FIG. 7a shows the closed loop system response for an extruder start up with the initial color error ΔL=1.0, Δa=0.5 and Δb=−1. Likewise, FIG. 7b shows the modification of the feed rates of colorants R1600, R61601, and R6171 to eliminate the initial color error just specified. It will now be appreciated that the invention is not restricted in scope to the use of this particular polymer, colorants, extruder or controller. This is but one particular embodiment in accordance with the invention.

A system for controlling the color of compounded polymer(s) in accordance with the invention may be operated in accordance with the following method. A predetermined amount of at least one polymer and a predetermined amount of at least one colorant additive may be fed, such as from the polymer or base resin reservoir in feeder 160 and from colorant feeder 130. The amounts of the polymer fed and the amounts of the colorant additive fed may be mixed, such as by extruder 140 to produce a substantially homogeneous mixture having substantially predetermined concentrations of the at least one polymer and the at least one colorant additive. It will now be appreciated that substantially predetermined amounts may be fed, such as in a batch process, or substantially predetermined amounts may be fed by providing the constituents at a substantially predetermined feedrate for a substantially predetermined time. Likewise, more constituents may continue to be fed while the previously fed constituents are mixed. Optical signals providing information about the color of the mixture produced may be measured, such as by sensor 110. The measured color of the mixture may be compared with a predetermined target color, such as illustrated in FIG. 1. The concentration of the at least one colorant additive provided may then be adjusted in response to any difference between the measured color of the mixture and the predetermined target color. For example, the feedrate of the at least one colorant additive may be adjusted. Furthermore, at least two other colorants may be mixed in addition to the previously cited colorant to provide the flexibility to modify the color of the mixture in three different "directions" or "dimensions," such as previously described. Likewise, any one of the colorant additives may have its concentration adjusted in response to any difference between the measured color of the mixture and the predetermined target color.

Prior to feeding the polymer(s) and the colorant(s) or colorant additive(s), the colorant additive(s) may be selected. As previously described, the colorant additives may be selected so that the gain matrix, G, for the effects of colorant concentration on the color of the compounded polymer(s) has a moderate condition number. Also, as previously described, optical signals providing information about the color of the mixture may be measured in various ways. For example, the reflectance spectra of the mixture may be measured. Likewise, the RGB color signals of the mixture may be measured.

As illustrated in FIG. 1, adjusting the concentrations of at least one of the colorants in the mixture, such as by modifying the feedrate of the particular colorant, may be conducted in accordance with a linear time-invarient closed loop feedback control process or system, such as previously described. Likewise, the feedrates of the colorant additives may be modified or adjusted in accordance with a fuzzy logic closed loop feedback control process or, alternatively, a neural network closed loop feedback control process.

While only certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A system for controlling the color of at least one compounded polymer comprising:

means for selecting at least one colorant additive such that a gain matrix G, for the effects of concentration of the at least one colorant upon the color of the mixture, will have a condition number indicative of no rank deficiency;

a compounder for mixing at least one polymer and said at least one colorant additive to produce a substantially homogeneous mixture;

a sensor for measuring optical signals and adapted to continually monitor the color of the mixture at substantially predetermined intervals;

a colorant additive feeder for providing, to the mixture being produced by said compounder, the at least one colorant additive at substantially predetermined colorant additive addition rates; and a controller, responsive to said sensor and coupled to said colorant additive feeder, for controlling the colorant additive addition rate of said colorant additive feeder.

2. The system of claim 1, wherein said sensor comprises a sensor for measuring optical signals providing color information selected from the group consisting essentially of a tristimulus colorimeter, a spectrophotometric colorimeter and a three-color camera.

3. The system of claim 1, wherein said sensor comprises an RGB camera.

4. The system of claim 1, wherein said compounder is adapted to mix at least two other colorant additives in addition to the at least one colorant additive to produce the substantially homogeneous mixture;

said feeder being adapted to provide the colorant additives to the mixture at independent, substantially predetermined, colorant additive addition rates; and said controller being adapted to independently control the colorant additive addition rates of said colorant additive feeder.

5. The system of claim 4, wherein said compounder comprises a base resin reservoir and feeder, and an extruder;

said extruder being, respectively, coupled to said base resin reservoir and feeder and said colorant additive addition feeder to, respectively, receive additions of the at least one polymer and the colorant additives.

6. The system of claim 4, wherein said controller comprises a device for implementing a linear, time invariant, closed loop feedback control process.

7. The system of claim 6, wherein said device comprises an integrated circuit and said linear, time invariant closed loop feedback control process comprises a linear, time-invariant control process substantially in accordance with the following equations:

$$K(s)=Q(s) \{I-P(s)Q(s)\}^{-1};$$

$$P(s)=GM(s)e^{-sT};$$

$$Q(s)=G^{-1}M^{-1}\_(s)F(s);$$

where s is the Laplace transform variable;

I is the identity matrix;

T is a transportation delay between said compounder and said sensor;

M(s) is a matrix of transfer functions for the effects of colorant additive addition rate changes by said colorant additive feeder on colorant concentration for each of the colorant additives;

M_(s) is the minimum phase portion of M(s); and

F(s) is a matrix of low pass filter transfer functions.

8. The system of claim 4, wherein said controller comprises a microprocessor for implementing a fuzzy logic feedback control process.

9. The system of claim 4, wherein said controller comprises a microprocessor for implementing a neural network feedback control process.

10. The system of claim 1, and further comprising a sensor for measuring the temperature of the substantially homogeneous mixture;

wherein said controller is further responsive to said temperature sensor.

* * * * *